United States Patent Office 3,461,124
Patented Aug. 12, 1969

3,461,124
STEROIDS OF THE 3,4-DIAZA-$\Delta^{1,4}$-ANDROSTA-DIENE SERIES
Seymour D. Levine, North Brunswick, N.J., assignor, by mesne assignments, to E. R. Squibb & Sons, Inc., New York, N.Y., a corporation of Delaware
No Drawing. Filed Oct. 1, 1965, Ser. No. 492,320
Int. Cl. C07d 101/00
U.S. Cl. 260—250
14 Claims

ABSTRACT OF THE DISCLOSURE

Steroidal compounds are disclosed which compounds are of the 3,4-diaza-$\Delta^{1,4}$-androstadiene series. Intermediates are also described. The final products are physiologically active steroids which possess anti-androgenic activity.

This invention relates to new steroidal compounds and, more particularly, to new steroids or the 3,4-diaza-$\Delta^{1,4}$-androstadiene series, new intermediates useful in the preparation of the same, and processes for preparing the same.

The new final products of this invention are of the Formula I:

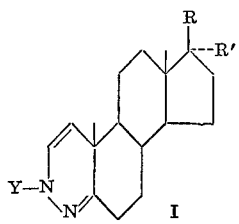

wherein Y is lower alkyl, aryl, aryl(lower alkyl), halo-lower alkyl, halo-aryl, haloaryl(lower alkyl), or trifluoromethylaryl; R is hydroxy or acyloxy; R' is hydrogen, lower alkyl, vinyl, ethynyl, halo-vinyl, halo-ethynyl or trifluoromethyl-ethynyl; or together R and R' is oxo (O=).

Among the suitable values for Y may be mentioned lower alkyl (e.g., methyl, ethyl, n-butyl and n-hexyl); aryl (e.g., phenyl, naphthyl, o, m, and p-tolyl and the xylyls); aryl(lower alkyl) (e.g., benzyl, phenethyl and β-phenylpropyl); halo substituted lower alkyl (e.g., 2-chloroethyl and 2,3-difluoroethyl and 2,2,2-trifluoroethyl); halo substituted aryl (e.g., o-chlorophenyl, p-fluorophenyl and o, p-dibromophenyl); halo-substituted aryl(lower alkyl) (e.g., p-chlorobenzyl and o-iodophenethyl); and trifluoromethylaryl (e.g., p - trifluoromethylphenyl). Among the suitable acyloxys may be mentioned the acyloxy radical of a hydrocarbon carboxylic acid of less than twelve carbon atoms, as exemplified by the lower alkanoic acids (e.g., acetic, propionic, butyric, hexanoic and enanthic acid), the lower alkenoic acids, the cyclo-alkane carboxylic acids, the cycloalkene carboxylic acids, the monocyclic aromatic carboxylic acids (e.g., benzoic acid), and the monocyclic aryl(lower alkanoic) acids e.g., phenacetic and β-phenylpropionic acid). Among the suitable halogen substituted vinyls may be mentioned perhalovinyls, such as trifluorovinyl, trichlorovinyl, 1,2-difluoro-2-chlorovinyl and 1,2-difluoro-2-bromovinyl; the dihalovinyls, such as 1,2-difluorovinyl, 2,2-difluorovinyl, 1-chloro-2-fluorovinyl, 1-bromo-2-fluorovinyl, and 1,2-dichlorovinyl; and the monohalovinyls, such as 1-fluorovinyl, 2-fluoro-vinyl, 1-chlorovinyl, 2-chlorovinyl and 1-bromovinyl. Among the suitable halogen substituted ethynyls may be mentioned fluoroethynyl, chloroethynyl and bromoethynyl.

The compounds of the instant invention are physiologically active steroids which possess anti-adrogenic activity, i.e., they inhibit the action of androgens, and they may be used in the treatment of such conditions as hyperandrogenic acne. The compounds may be formulated for such administration, the concentration and/or dosage being based on the activity of the particular compound and the requirements of the patient.

To prepare the compounds of this invention, 3-oxa-A-norandrostane-5β,17β-diol-2-one is reacted with a hydrazine of the formula: Y—NH—$NH_2$, wherein Y is as hereinbefore defined; the reaction preferably being conducted at an elevated temperature, such as the reflux temperature of the reaction mixture. The process results in the preparation of new intermediates of this invention having the Formula II:

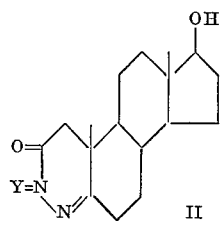

wherein Y is as hereinbefore defined.

These intermediates are then reduced, as by treatment with lithium aluminum hydride and then acylated in the presence of an acylating agent, such as the acyl chloride or acid anhydride of one of the acids specifically mentioned hereinbefore, and an organic base, such as pyridine, to yield those final products of Formula I, wherein R is acyloxy and R' is hydrogen. These final products can then be hydrolyzed, as by treatment with a weak base, such as potassium carbonate, to yield those final products wherein R is hydroxy; and the latter may be oxidized, as by treatment with chromium trioxide to yield those final products wherein R and R' together are oxo, or acylated by treatment with an acyl chloride or acid anhydride to yield other 17β-esters of this invention.

The 17-keto compound can be treated with a Grignard, such as a lower alkyl magnesium iodide, to yield those final products wherein R' is lower alkyl and R is hydroxy, or with a R' substituted lithium to yield those final products wherein R' is a vinyl or ethynyl substituent and R is hydroxy. In either event the resulting R'-substituted products can then be esterified by treatment with an acyl chloride or acid anhydride in the presence of perchloric acid to yield those final products wherein R' is other than hydrogen, and R is acyloxy.

The following examples illustrate the invention (all temperatures being in centigrade):

EXAMPLE 1

3-methyl-3,4-diaza-$\Delta^4$-androstene-2-one-17β-ol (a) Preparation of A-norandrostane-2-one-3β,5β,17β-triol.—A mixture of 3.25 g. of A-nortestosterone and 3.0 g. of osmium tetroxide in 3 ml. of pyridine and 60 ml. of benzene is stirred at room temperature for forty-eight hours. The reaction mixture is diluted with 100 ml. of dioxane and treated with hydrogen sulfide for five minutes. The precipitate is filtered and the filtrate is evaporated to dryness and crystallized from ethyl acetate to give A-norandrostane-2-one-3β,5β,17β-triol.

(b) Preparation of 3-oxa-A-norandrostane-5β,17β-diol-2-one.—A solution of 3.9 g. of periodic acid in 10 ml. of water is added to a solution of 1.93 g. of A-norandrostane-2-one-3β,5β,17β-triol in 10 ml. of pyridine and 80 ml. of methanol and the reaction mixture is left at room temperature for sixteen and one-half hours. The reaction mixture is evaporated to near dryness, and the residue diluted with water and extracted three times with chloroform. The chloroform extracts are extracted three times with a saturated sodium bicarbonate solution. The aqueous phase is acidified and extracted four times with ethyl acetate. The ethyl acetate extracts are washed with 8% salt solution, dried over sodium sulfate, and evaporated to dryness. Crystallization of the residue from ether-ethyl acetate gives 1.14 g. of 3-oxa-A-norandrostane-5β,17β-diol-2-one having a melting point of 183–184°.

(c) Preparation of 3-methyl-3,4-diaza-Δ⁴-androstene-2-one-17β-ol.—A mixture of 450 mg. of 3-oxa-A-norandrostane-5β,17β-diol-2-one and 0.22 ml. of methylhydrazine in 5 ml. of ethanol is refluxed for 3.5 hr., diluted with water and extracted with ether. The ether extracts are washed with 8% salt solution, dried over sodium sulfate and evaporated to dryness. The residue is crystallized from chloroform-isopropyl ether to give about 327 mg. of 3-methyl-3,4-diaza-Δ⁴-androstene-2-one-17β-ol, M.P. about 196.5–197.5°. The analytical sample is prepared by recrystallization from chloroform-isopropyl ether, M.P. about 196.5–197.5°; $[\alpha]_D^{23}$ +14° (EtOH); $\lambda^{KBr}$ 2.93 and 6.10μ; $\lambda^{MeOH}$ 252μ (7650);

$\tau^{TMS}_{CDCl_3}$ 9.21 (s, 18-Me), 8.95 (s, 19-Me), 6.69 (s, 3-Me) and 6.35 (m, 17α-H)

*Analysis.*—Calc'd for $C_{18}H_{28}O_2N_2$ (304.42): C, 71.01; H, 9.27; N, 9.20. Found: C, 71.15; H, 9.16; N, 9.39.

EXAMPLE 2

3-phenyl-3,4-diaza-Δ⁴-androstene-2-one-17β-ol

A mixture of 400 mg. of 3-oxa-A-norandrostane-5β,17β-diol-2-one and 0.2 ml. of phenylhydrazine in 5 ml. of ethanol is refluxed for 4.25 hr. diluted with water and extracted with ether. The ether extracts are washed with 8% salt solution, dried over sodium sulfate and evaporated to dryness. The residue is crystallized from methanol-isopropyl ether to give about 237 mg. of 3-phenyl-3,4-diaza-Δ⁴-androstene-2-one-17β-ol, M.P. about 175–177°. The analytical sample is prepared by recrystallization from methanol-isopropyl ether, M.P. about 188–190°; $\lambda^{KBr}$ 2.94, 5.97, 6.27 and 6.70μ; $\lambda^{MeOH}$ 237μ (11,500), sh. 260 mμ (5850);

$\tau^{TMS}_{CDCl_3}$ 9.19 (s, 18-Me) and 8.83 (s, 19-Me)

*Analysis.*—Calc'd for $C_{23}H_{30}O_2N_2$: C, 75.37; H, 8.25; N, 7.64. Found: C, 75.31; H, 8.32; N, 7.63.

EXAMPLE 3

3-p-fluorophenyl-3,4-diaza-Δ⁴-androstene-2-one-17β-ol

A mixture of 450 mg. of 3-oxa-A-norandrostane-5β,17β-diol-2-one, 225 mg. of p-fluorophenylhydrazine hydrochloride and 115 mg. of sodium acetate in 5 ml. of ethanol is refluxed for 3.5 hr. under helium, diluted with water and extracted with chloroform. The chloroform extracts are washed with 8% salt solution, dried over sodium sulfate and evaporated to dryness. The residue is crystallized from ethyl acetate-hexane to give about 526 mg. of 3-p-fluorophenyl-3,4-diaza-Δ⁴-androstene-2-one-17β-ol, M.P. about 154–157° (ethyl acetate solvate). The analytical sample is prepared by recrystallization from methanol, M.P. about 182–183.5°; $[\alpha]_D^{21}$ −14° (EtOH); $\lambda^{KBr}$ 2.94, 5.98, 6.26 and 6.70μ; $\lambda^{MeOH}$ 234 mμ (11,800), sh. 260 mμ (5870);

$\tau^{TMS}_{CDCl_3}$ 9.19 (s, 18-Me), 8.84 (s, 19-Me) and 6.33 (m, 17α-H)

*Analysis.*—Calc'd for $C_{23}H_{29}O_2N_2F$ (384.48): C, 71.85; H, 7.60; N, 7.28. Found: C, 71.96; H, 7.60; N, 7.44.

Similarly, by following the procedure of Examples 1 to 3, but substituting the indicated hydrazine for the hydrazines used in the examples, the designated 3-Y substituted-3,4-diazo-Δ⁴-androstene-2-one-17β-ol is formed:

| Example | Reactant | Product (Y is) |
| --- | --- | --- |
| 4 | Ethylhydrazine | Ethyl. |
| 5 | n-Hexylhydrazine | n-Hexyl. |
| 6 | Naphthylhydrazine | Naphthyl. |
| 7 | p-Tolylhydrazine | p-Tolyl. |
| 8 | Benzylhydrazine | Benzyl. |
| 9 | 2-chloroethylhydrazine | 2-chloroethyl. |
| 10 | (2,2,2-trifluoroethyl)-hydrazine | 2,2,2-trifluoroethyl. |
| 11 | o,p-Dibromophenylhydrazine. | o,p-Dibromophenyl. |
| 12 | p-Chlorobenzylhydrazine | p-Chlorobenzyl. |
| 13 | p-Trifluoromethylphenyl-hydrazine. | p-Trifluoromethylphenyl. |

EXAMPLE 14

3-p-fluorophenyl-3,4-diaza-Δ¹,⁴-androstadiene-17β-ol acetate

A solution of 368 mg. of 3-p-fluorophenyl-3,4-diaza-Δ⁴-androstene-2-one-17β-ol in 75 ml. of ether is treated with 125 mg. of lithium aluminum hydride in 8 ml. of ether for one minute. Ethyl acetate (100 ml.) is added to decompose excess hydride and this solution treated with 75 ml. of a saturated Rochelle salt solution. The organic layer is separated and the aqueous phase extracted with chloroform. The combined organic fractions are washed with 8% salt solution, dried over sodium sulfate and evaporated to dryness. The residue is refluxed in 2 ml. of acetic anhydride and 0.2 ml. of pyridine for 1 hr., diluted with water and extracted with ether. The ether extracts are washed with saturated sodium bicarbonate solution and 8% salt solution, dried over sodium sulfate and evaporated to dryness. Plate chromatography of the residue using neutral alumina (Act. V) as the adsorbent and chloroform as the developing solvent gives a major band detectable by ultraviolet. Elution with ethyl acetate gives a residue which is crystallized from petroleum ether to give about 232 mg. of 3-p-fluorophenyl-3,4-diaza-Δ¹,⁴-androstadiene-17β-ol acetate, M.P. about 144–146°. The analytical sample is prepared by recrystallization from petroleum ether, M.P. about 144–146°; $[\alpha]_D^{24}$ −10° (chf.); $\lambda^{KBr}$ 5.77, 6.01 and 6.19μ; $\lambda^{MeOH}$ 277 mμ (24,900);

$\tau^{TMS}_{CDCl_3}$ 9.15 (s, 18-Me), 8.82 (s, 19-Me), 7.95 (s, 17β–acetate), 5.41 (m, 17α–H), 5.27 (d, J=8 c.p.s., 1–H) and 3.44 (d, J=8 c.p.s., 2–H)

*Analysis.*—Calc'd for $C_{25}H_{31}O_2N_2F$ (410.51): C, 73.15; H, 7.61; N, 6.83. Found: C, 73.12; H, 7.60; N, 7.13.

Similarly, by following the procedure of Example 14, but substituting the indicated 3-Y substituted-3,4-diaza-Δ⁴-androstene 2-one-17β-ol for the steroid reactant, the designated 3-Y substituted - 3,4-diaza-Δ¹,⁴-androstadiene-17β-ol acetate is formed:

| Example | Reactant (Y is) | Product (Y is) |
| --- | --- | --- |
| 15 | Methyl | Methyl. |
| 16 | Phenyl | Phenyl. |
| 17 | Ethyl | Ethyl. |
| 18 | n-Hexyl | n-Hexyl. |
| 19 | Naphthyl | Naphthyl. |
| 20 | p-Tolyl | p-Tolyl. |
| 21 | Benzyl | Benzyl. |
| 22 | 2-chloroethyl | 2-chloroethyl. |
| 23 | 2,2,2-trifluoroethyl | 2,2,2-trifluoroethyl. |
| 24 | o,p-Dibromophenyl | o,p-Dibromophenyl. |
| 25 | p-Chlorobenzyl | p-Chlorobenzyl. |
| 26 | p-Trifluoromethyl-phenyl | p-Trifluoromethylphenyl. |

EXAMPLE 27

3-p-fluorophenyl-3,4-diaza-Δ¹,⁴-androstadiene-17β-ol

A mixture of 500 mg. of 3-p-fluorophenyl-3,4-diaza-Δ¹,⁴-androstadiene - 17β-ol acetate in 30 ml. of methanol is treated with 3 ml. of 10% potassium carbonate solution and stirred at room temperature for 20 hr. The reaction mixture is diluted with water and extracted with chloroform. The chloroform extracts are washed with 8% salt solution, dried over sodium sulfate and evaporated to dryness, to give 3-p-fluorophenyl-3,4-diaza-$\Delta^{1,4}$-androstadiene-17β-ol.

Similarly, by following the produce of Example 27, but substituting the indicated 3-Y substituted-3,4-diaza-$\Delta^{1,4}$-androstadiene-17β-ol acetate for the steroid reactant, the designated 3-Y substituted - 3,4-diaza-$\Delta^{1,4}$-androstadiene-17β-ol is formed:

| Example | Reactant (Y is) | Product (Y is) |
| --- | --- | --- |
| 28 | Methyl | Methyl. |
| 29 | Phenyl | Phenyl. |
| 30 | Ethyl | Ethyl. |
| 31 | n-Hexyl | n-Hexyl. |
| 32 | p-Tolyl | p-Tolyl. |
| 33 | Naphthyl | Naphthyl. |
| 34 | Benzyl | Benzyl. |
| 35 | 2-chloroethyl | 2-chloroethyl. |
| 36 | 2,2,2-trifluoroethyl | 2,2,2-trifluoroethyl. |
| 37 | o,p-Dibromophenyl | o,p-Dibromophenyl. |
| 38 | p-Chlorobenzyl | p-Chlorobenzyl. |
| 39 | p-Trifluoromethylphenyl | p-Trifluoromethylphenyl. |

EXAMPLE 40

3-p-fluorophenyl-3,4-diaza-$\Delta^{1,4}$-androstadiene-17β-ol

A mixture of 200 mg. of 3-p-fluorophenyl-3,4-diaza-$\Delta^{1,4}$-androstadiene-17-ol, 2 ml. of propionic anhydride and 0.2 ml. of pyridine is refluxed for 1 hr., cooled, diluted with water and extracted with chloroform. The chloroform extracts are washed with 8% salt solution, dried over sodium sulfate and evaporated to dryness to give 3-p-fluorophenyl-3,4-diaza-$\Delta^{1,4}$-androstadiene-17β-ol propionate.

EXAMPLE 41

3-p-fluorophenyl-3,4-diaza-$\Delta^{1,4}$-androstadiene-17-one

A solution of 55 mg. of 3-p-fluorophenyl-3,4-diaza-$\Delta^{1,4}$-androstadiene-17β-ol in 10 ml. of acetone is treated dropwise with an equivalent amount of chromium trioxide-sulfuric acid. The chromic sulfate is removed by filtration and washed with additional acetone. The filtrate is concentrated, diluted with water and extracted with chloroform. The chloroform extracts are washed with 8% salt solution, dried over sodium sulfate and evaporated to dryness to give 3-p-fluorophenyl-3,4-diaza-$\Delta^{1,4}$-androstadiene-17-one.

Similarly, by following the procedure of Example 41, but substituting the indicated 3-Y substituted-3,4-diaza-$\Delta^{1,4}$-androstadiene-17β - ol for the steroid reactant, the designated 3-Y substituted 3,4-diaza-$\Delta^{1,4}$-androstadiene-17-one is formed:

| Example | Reactant (Y is) | Product (Y is) |
| --- | --- | --- |
| 42 | Methyl | Methyl. |
| 43 | Phenyl | Phenyl. |
| 44 | Ethyl | Ethyl. |
| 45 | n-Hexyl | n-Hexyl. |
| 46 | Naphthyl | Naphthyl. |
| 47 | p-Tolyl | p-Tolyl. |
| 48 | Benzyl | Benzyl. |
| 49 | 2-chloroethyl | 2-chloroethyl. |
| 50 | 2,2,2-trifluoroethyl | 2,2,2-trifluoroethyl. |
| 51 | o,p-Dibromophenyl | o,p-Dibromophenyl. |
| 52 | p-Chlorobenzyl | p-Chlorobenzyl. |
| 53 | p-Trifluoromethylphenyl | p-Trifluoromethylphenyl. |

3-p-fluorophenyl-17α-methyl-3,4-diaza-$\Delta^{1,4}$-androstadiene-17β-ol

A solution of 150 mg. of 3-p-fluorophenyl-3,4-diaza-$\Delta^{1,4}$-androstadiene-17-one in 20 ml. of tetrahydrofuran is treated with a five-fold excess of methyl magnesium iodide in 20 ml. of ether and refluxed for 5 hours. The reaction mixture is treated with a saturated ammonium chloride solution and the organic layer separated. The organic layer is washed with 8% salt solution, dried over sodium sulfate and evaporated to give 3 - p-fluorophenyl-17α-methyl-3,4-diaza-$\Delta^{1,4}$-androstadiene-17β-ol.

Similarly, by following the procedure of Example 54, but substituting the indicated 3-Y substituted - 3,4-diaza-$\Delta^{1,4}$-androstadiene-17-one for the steroid reactant, the designated 17α - methyl-3-Y substituted-3,4-diaza-$\Delta^{1,4}$-androstadiene-17β-ol is formed:

| Example | Reactant (Y is) | Product (Y is) |
| --- | --- | --- |
| 55 | Methyl | Methyl. |
| 56 | Phenyl | Phenyl. |
| 57 | Ethyl | Ethyl. |
| 58 | n-Hexyl | n-Hexyl. |
| 59 | Naphthyl | Naphthyl. |
| 60 | p-Tolyl | p-Tolyl. |
| 61 | Benzyl | Benzyl. |
| 62 | 2-chloroethyl | 2-chloroethyl. |
| 63 | 2,2,2-trifluoroethyl | 2,2,2-trifluoroethyl. |
| 64 | o,p-Dibromophenyl | o,p-Dibromophenyl. |
| 65 | p-Chlorobenzyl | p-Chlorobenzyl. |
| 66 | p-Trifluoromethylphenyl | p-Trifluoromethylphenyl. |

EXAMPLE 67

3-p-fluorophenyl-17α-ethynyl-3,4-diaza-$\Delta^{1,4}$-androstadiene-17β-ol

A mixture of 500 mg. of 3-p-fluorophenyl-3,4-diaza-$\Delta^{1,4}$-androstadiene-17-one and 750 mg. of lithium acetylide- and ethylenediamine complex in 20 ml. of benzene and 20 ml. of tetrahydrofuran is warmed at 50° for 20 hr. under nitrogen with stirring. The reaction mixture is treated with 15 ml. of water and refluxed for 1 hr. and the organic layer separated. The aqueous phase is further diluted with water and extracted with chloroform. The organic fractions are combined, washed with 8% salt solution, dried over sodium sulfate, and evaporated to give 3-p-fluorophenyl - 17α-ethynyl-3,4-diaza-$\Delta^{1,4}$-androstadiene-17β-ol.

Similarly, by following the procedure of Example 67, but substituting the indicated 3-Y substituted-3,4-diaza-$\Delta^{1,4}$-androstadiene-17-one for the steroid reactant, the designated 17α-ethynyl 3-Y substituted-3,4-diaza-$\Delta^{1,4}$-androstadiene-17β-ol is formed:

| Example | Reactant (Y is) | Product (Y is) |
| --- | --- | --- |
| 68 | Methyl | Methyl. |
| 69 | Phenyl | Phenyl. |
| 70 | Ethyl | Ethyl. |
| 71 | n-Hexyl | n-Hexyl. |
| 72 | Naphthyl | Naphthyl. |
| 73 | p-Tolyl | p-Tolyl. |
| 74 | Benzyl | Benzyl. |
| 75 | 2-chloroethyl | 2-chloroethyl. |
| 76 | 2,2,2-trifluoroethyl | 2,2,2-trifluoroethyl. |
| 77 | o,p-Dibromophenyl | o,p-Dibromophenyl. |
| 78 | p-Chlorobenzyl | p-Chlorobenzyl. |
| 79 | p-Trifluoromethylphenyl | p-Trifluoromethylphenyl. |

What is claimed is:
1. A steroid of the formula

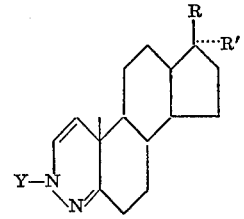

wherein Y is selected from the group consisting of lower alkyl, aryl, aryl(lower alkyl), halo-lower alkyl, halo-aryl, haloaryl(lower alkyl) and trifluoromethylaryl wherein lower alkyl is a hydrocarbon having from one to six carbons and aryl is selected from the group consisting of phenyl and naphthyl; R is selected from the group consisting of hydroxy and the acyloxy radical of a hydrocarbon carboxylic acid of less than twelve carbon atoms; R' is selected from the group consisting of hydrogen, lower alkyl, vinyl, ethynyl, halovinyl, haloethynyl and trifluoromethylethynyl; and together R and R' are oxo.

2. 3-p-fluorophenyl-3,4-diaza-$\Delta^{1,4}$-androstadiene - 17β-ol acetate.

3. 3 - p-fluorophenyl-3,4-diaza-$\Delta^{1,4}$-androstadiene-17β-ol.

4. 3-methyl-3,4-diaza-$\Delta^{1,4}$-androstadiene-17β-ol.

5. 3 - phenyl-3,4-diaza-$\Delta^{1,4}$-androstadiene-17β-ol.

6. 3-p-fluorophenyl-3,4-diaza-$\Delta^{1,4}$-androstadiene-17-one.
7. 3-methyl-3,4-diaza-$\Delta^{1,4}$-androstadiene-17-one.
8. 3-phenyl-3,4-diaza-$\Delta^{1,4}$-androstadiene-17-one.
9. 3 - p-fluorophenyl - 17α-methyl-3,4-diaza-$\Delta^{1,4}$-androstadiene-17β-ol.
10. 3 - p-fluorophenyl-17-ethynyl-3,4-diaza-$\Delta^{1,4}$-androstadiene-17β-ol.
11. A steroid of the formula

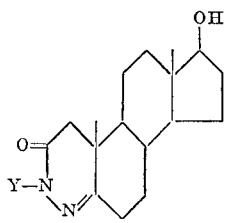

wherein Y is selected from the group consisting of lower alkyl, aryl, aryl(lower alkyl), halo-lower alkyl, halo-aryl, halo-aryl(lower alkyl) and trifluoromethylaryl wherein lower alkyl is a hydrocarbon having from one to six carbons and aryl is selected from the group consisting of phenyl and naphthyl.
12. 3-methyl-3,4-diaza-$\Delta^4$-androstene-2-one-17β-ol.
13. 3 - phenyl-3,4-diaza-$\Delta^4$-androstene-2-one-17β-ol.
14. 3 - p-fluorophenyl - 3,4-diaza-$\Delta^4$-androstene-2-one 17β-ol.

References Cited

Caspi et al.: Chemistry and Industry, pp. 1495–1496 (1963).

Wertheim: Textbook of Organic Chemistry, pp. 763–764 (1945).

NICHOLAS S. RIZZO, Primary Examiner

U.S. Cl. X.R.
424—250